United States Patent
Francois et al.

(10) Patent No.: US 10,135,716 B2
(45) Date of Patent: Nov. 20, 2018

(54) LATENCY OPTIMIZED SEGMENT ROUTING TUNNELS

(71) Applicant: Cisco Technology, Inc., San Jose, CA (US)

(72) Inventors: Pierre Francois, Madrid (ES); Francois Clad, Madrid (ES); Alan Gous, Palo Alto, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 14/996,541

(22) Filed: Jan. 15, 2016

(65) Prior Publication Data

US 2017/0111261 A1    Apr. 20, 2017

(30) Foreign Application Priority Data

Oct. 15, 2015 (EP) .................................. 15382506

(51) Int. Cl.
*H04L 12/733* (2013.01)
*H04L 12/721* (2013.01)
*H04L 12/729* (2013.01)

(52) U.S. Cl.
CPC .......... *H04L 45/122* (2013.01); *H04L 45/125* (2013.01); *H04L 45/44* (2013.01)

(58) Field of Classification Search
CPC .................................................. H04L 45/122
See application file for complete search history.

(56) References Cited

U.S. PATENT DOCUMENTS

| | | | | |
|---|---|---|---|---|
| 2004/0168088 A1* | 8/2004 | Guo | ..................... | H04L 12/2859 726/15 |
| 2008/0219268 A1* | 9/2008 | Dennison | ............ | H04L 12/4625 370/395.2 |
| 2012/0252509 A1* | 10/2012 | Wen | ..................... | H04B 7/2606 455/500 |
| 2013/0232193 A1* | 9/2013 | Ali | ......................... | H04L 67/42 709/203 |
| 2014/0169370 A1* | 6/2014 | Filsfils | ................... | H04L 69/166 370/392 |
| 2014/0269421 A1 | 9/2014 | Previdi et al. | | |
| 2015/0365328 A1* | 12/2015 | Luke | ..................... | H04L 47/125 370/238 |
| 2017/0063705 A1* | 3/2017 | Gilson | ................... | H04L 47/286 |

* cited by examiner

*Primary Examiner* — John D Blanton
(74) *Attorney, Agent, or Firm* — Edell, Shapiro & Finnan, LLC (57) ABSTRACT

A method and related apparatus for providing latency optimized segment routing tunnels is described herein and includes obtaining a latency metric for each segment that links respective pairs of nodes in a network, determining a tunnel through the network between a first endpoint and a second endpoint that is optimized for latency, and, once such a tunnel is determined, causing a packet to travel along the tunnel that is optimized for latency by encoding the packet with segment routing instructions for the network, wherein the network is configured to provide shortest paths according to a metric other than latency.

18 Claims, 9 Drawing Sheets

FIG.1

| SCR/DST | A | B | C | D | E | F | Z |
|---------|---|---|---|---|---|---|---|
| A | 0 | 55 | 75 | 75 | 5 | 65 | 80 |
| B | 55 | 0 | 20 | 70 | 50 | 80 | 75 |
| C | 75 | 20 | 0 | 50 | 70 | 60 | 55 |
| D | 75 | 70 | 50 | 0 | 70 | 10 | 5 |
| E | 5 | 50 | 70 | 70 | 0 | 60 | 75 |
| F | 65 | 80 | 60 | 10 | 60 | 0 | 15 |
| Z | 80 | 75 | 55 | 5 | 75 | 15 | 0 |

FIG.2
INITIALIZATION - B MATRIX

| SCR/DST | A | B | C | D | E | F | Z |
|---|---|---|---|---|---|---|---|
| A | 0 {} | 56 {B} | 77 {C} | 128 {D} | 5 {E} | 65 {F} | 133 {Z} |
| B | 56 {A} | 0 {} | 20 {to_C-2} | 72 {D} | 50 {to_E-1} | 83 {F} | 77 {Z} |
| C | 77 {A} | 20 {to_B-2} | 0 {} | 50 {to_D-2} | 72 {E} | 62 {F} | 56 {Z} |
| D | 128 {A} | 72 {B} | 50 {to_C-2} | 0 {} | 123 {E} | 10 {to_F-1} | 5 {Z} |
| E | 5 {A} | 50 {to_B-1} | 72 {C} | 123 {D} | 0 {} | 60 {F} | 128 {Z} |
| F | 65 {A} | 83 {B} | 62 {C} | 10 {to_D-1} | {E} | 0 {} | 16 {Z} |
| Z | 133 {A} | 77 {B} | 56 {C} | 5 {D} | 128 {E} | 16 {F} | 0 {} |

FIG.3

INITIALIZATION - $L_0$ AND $S_0$

| SCR/DST | A | B | C | D | E | F | Z |
|---|---|---|---|---|---|---|---|
| A | 0<br>{} | 55<br>{E, to_B-1} | 76<br>{B, to_C-2} | 75<br>{F, to_D-1} | 5<br>{E} | 65<br>{F} | 81<br>{F, Z} |
| B | 55<br>{to_E-1, A} | 0<br>{} | 20<br>{to_C-2} | 70<br>{to_C-2, to_D-2} | 50<br>{to_E-1} | 82<br>{to_C-2, F} | 76<br>{to_C-2, Z} |
| C | 76<br>{to_B-2, A} | 20<br>{to_B-2} | 0<br>{} | 50<br>{to_D-2} | 70<br>{to_B-2, to_E-1} | 60<br>{to_D-2, to_F-1} | 55<br>{to_D-2, Z} |
| D | 75<br>{to_F-1, A} | 70<br>{to_C-2, to_B-2} | 50<br>{to_C-2} | 0<br>{} | 70<br>{to_F-1, E} | 10<br>{to_F-1} | 5<br>{Z} |
| E | 5<br>{A} | 50<br>{to_B-1} | 70<br>{to_B-1, to_C-2} | 70<br>{F, to_D-1} | 0<br>{} | 60<br>{F} | 76<br>{F, Z} |
| F | 65<br>{A} | 82<br>{C, to_B-2} | 60<br>{to_D-1, to_C-2} | 10<br>{to_D-1} | 60<br>{E} | 0<br>{} | 15<br>{to_D-1, Z} |
| Z | 81<br>{F, A} | 76<br>{C, to_B-2} | 55<br>{D, to_C-2} | 5<br>{D} | 76<br>{E} | 15<br>{D, to_F-1} | 0<br>{} |

FIG.4

FIRST ITERATION - $L_1$ AND $S_1$

| SCR/DST | A | B | C | D | E | F | Z |
|---|---|---|---|---|---|---|---|
| A | 0 {} | 55 {E, to_B-1} | 75 {E, to_B-1, to_C-2} | 75 {F, to_D-1} | 5 {E} | 65 {F} | 80 {F, to_D-1, Z} |
| B | 55 {to_E-1, A} | 0 {} | 20 {to_C-2} | 70 {to_C-2, to_D-2} | 50 {to_E-1} | 80 {to_C-2, to_D-2, to_F-1} | 75 {to_C-2, to_D-2, Z} |
| C | 75 {to_B-2, to_E-1, A} | 20 {to_B-2} | 0 {} | 50 {to_D-2} | 70 {to_B-2, to_E-1} | 60 {to_D-2, to_F-1} | 55 {to_D-2, Z} |
| D | 75 {to_F-1, A} | 70 {to_C-2, to_B-2} | 50 {to_C-2} | 0 {} | 70 {to_F-1, E} | 10 {to_F-1} | 5 {Z} |
| E | 5 {A} | 50 {to_B-1} | 70 {to_B-1, to_C-2} | 70 {F, to_D-1} | 0 {} | 60 {F} | 75 {F, to_D-1, Z} |
| F | 65 {A} | 80 {to_D-1, to_C-2, to_B-2} | 60 {to_D-1, to_C-2} | 10 {to_D-1} | 60 {E} | 0 {} | 15 {to_D-1, Z} |
| Z | 80 {D, to_F-1, A} | 75 {D, to_C-2, to_B-2} | 55 {D, to_C-2} | 5 {D} | 75 {D, to_F-1, E} | 15 {D, to_F-1} | 0 {} |

FIG.5

SECOND ITERATION - $L_1$ AND $S_1$

| SCR/DST | A | B | C | D | E | F | Z |
|---|---|---|---|---|---|---|---|
| A | {} | {E, to_B-1} | {E, to_B-1, to_C-2} | {F, to_D-1} | {E} | {F} | {F, to_D-1, Z} |
| B | {to_E-1, A} | {} | {to_C-2} | {to_C-2, to_D-2} | {to_E-1} | {to_C-2, to_D-2, to_F-1} | {to_C-2, to_D-2, Z} |
| C | {to_B-2, to_E-1, A} | {to_B-2} | {} | {to_D-2} | {to_B-2, to_E-1} | {to_D-2, to_F-1} | {to_D-2, Z} |
| D | {to_F-1, A} | {to_C-2, to_B-2} | {to_C-2} | {} | {to_F-1, E} | {to_F-1} | {Z} |
| E | {A} | {to_B-1} | {to_B-1, to_C-2} | {to_D-1} | {} | {F} | {F, to_D-1, Z} |
| F | {A} | {to_D-1, to_C-2, to_B-2} | {to_D-1, to_C-2} | {to_D-1} | {E} | {} | {to_D-1, Z} |
| Z | {D, to_F-1, A} | {D, to_C-2, to_B-2} | {D, to_C-2} | {D} | {D, to_F-1, E} | {D, to_F-1} | {} |

FIG.6
RESULT MATRIX - NO MARGIN

| SCR/DST | A | B | C | D | E | F | Z |
|---|---|---|---|---|---|---|---|
| A | {} | {B} | {C} | {F, to_D-1} | {E} | {F} | {F, Z} |
| B | {A} | {} | {to_C-2} | {D} | {to_E-1} | {F} | {Z} |
| C | {A} | {to_B-2} | {} | {to_D-2} | {E} | {F} | {Z} |
| D | {to_F-1, A} | {B} | {to_C-2} | {} | {to_F-1, E} | {to_F-1} | {Z} |
| E | {A} | {to_B-1} | {C} | {F, to_D-1} | {} | {F} | {F, Z} |
| F | {A} | {B} | {C} | {to_D-1} | {E} | {} | {Z} |
| Z | {F, A} | {B} | {C} | {D} | {F, E} | {F} | {} |

FIG.7
RESULT MATRIX - 3ms MARGIN

LATENCY OPTIMIZED SEGMENT ROUTING TUNNELS

This application claims the benefit of European Application No. 15382506.2, filed on Oct. 15, 2015, the subject matter of which is incorporated herein by reference.

TECHNICAL FIELD

Embodiments described herein relate to operations of a network via segment routing.

BACKGROUND

Segment Routing (SR) enables any node (e.g., a Server, Provider Edge (PE) router, Aggregation router, Provider (P) router) to select an explicit path for each of its traffic classes. This explicit path does not depend on a hop-by-hop signaling technique (e.g., Label Distribution Protocol (LDP) or Resource reSerVation Protocol (RSVP)). It depends, rather, on a set of "segments" that are advertised by a link-state routing protocol. These segments act as topological sub-paths that can be combined together to form the desired explicit path. There are two forms of segments: nodal and adjacency. A nodal segment represents a path to a node. An adjacency segment represents a specific adjacency to a node. A nodal segment is typically a multi-hop path while an adjacency segment is a one-hop path. SR's control-plane can be applied to the Multi Protocol Label Switching (MPLS) data plane, wherein a nodal segment to node N is instantiated in the MPLS data plane as a Labeled Switched Path (LSP) along the shortest-path to the node. An adjacency segment is instantiated in the MPLS data plane as a cross-connect entry pointing to a specific egress data link.

DESCRIPTION OF EXAMPLE EMBODIMENTS

Overview

A method and related apparatus for providing latency optimized segment routing tunnels is described herein and includes obtaining a latency metric for each segment that links respective pairs of nodes in a network, determining a tunnel through the network between a first endpoint and a second endpoint that is optimized for latency, and, once such a tunnel is determined, causing a packet to travel along the tunnel that is optimized for latency by encoding the packet with a minimum number of segment routing instructions for the network, wherein the network is configured to provide shortest paths according to a metric other than latency.

Example Embodiments

Figure 1:
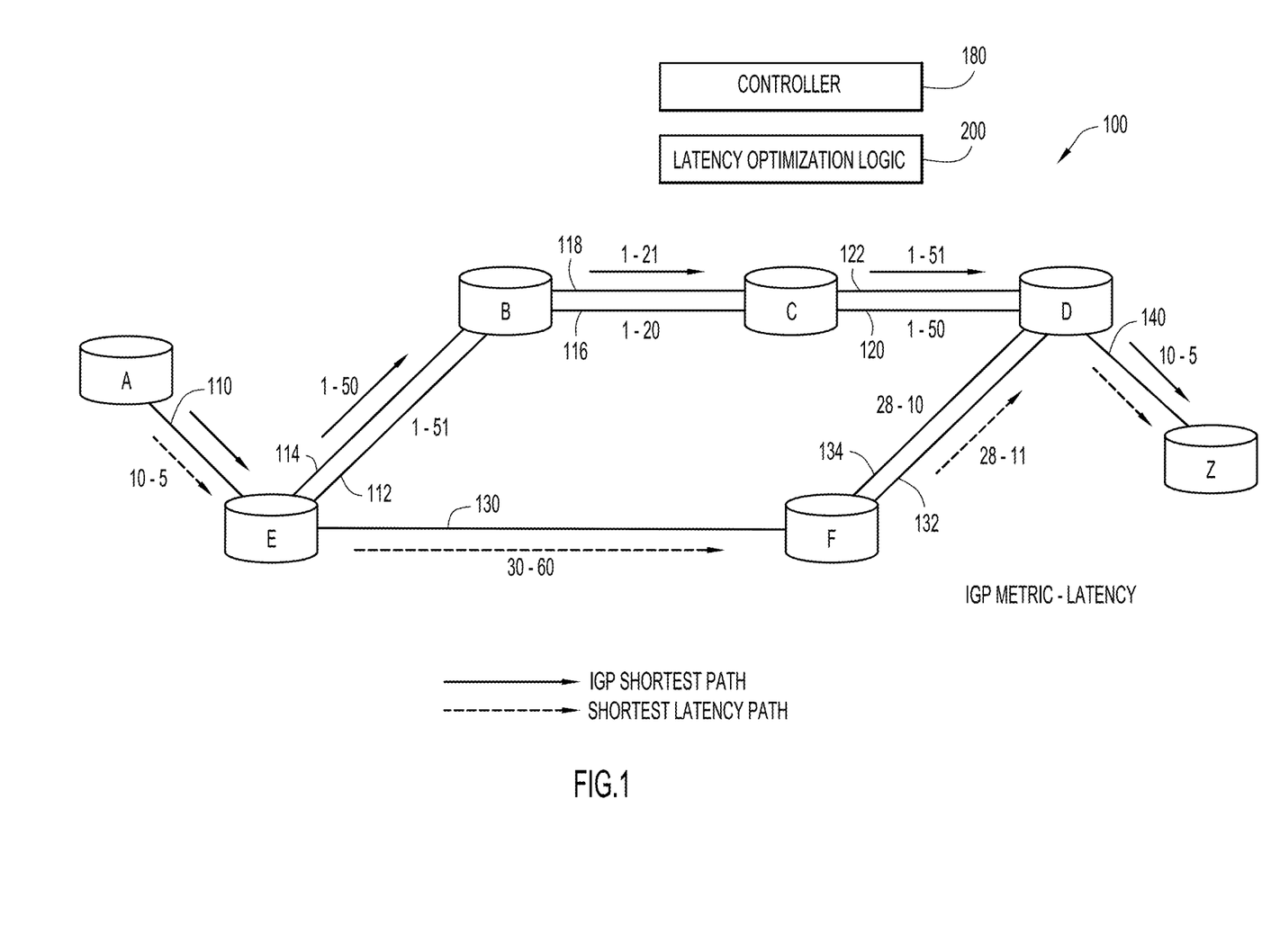
FIG. 1 depicts a network topology in which latency optimization in a bandwidth optimized network can be performed according to an example embodiment.

FIG. 1 depicts a network topology in which latency optimization in a bandwidth optimized network can be performed according to an example embodiment. More specifically, electronic communications network (or, simply, network) 100 comprises a plurality of routers (and/or switches) A, B, C, D, E, F and Z. Router A is in communication with Router E via segment (or link or path) 110. Router E is in communication with Router B via two segments, links or paths 112, 114. Router B is in communication with Router C via two segments 116, 118. Router C is in communication with Router D via two segments 120, 122. Router D is in communication with Router Z via segment 140. Router E is in communication with Router F via segment 130. And Router F is in communication with Router D via two segments 132, 134. For purposes of discussion, Router A and Router Z may be considered endpoints. The depicted segments, links or paths may be wired or wireless connections.

A purpose of the embodiments described herein is to establish a preferred "tunnel" through network 100 that enables, e.g., endpoints Router A and Router Z to communicate, in the instant context, with an optimized amount of latency, using segment routing in network 100, where network 100 has been optimized for a metric other than latency, e.g., bandwidth.

Also shown in FIG. 1 is a controller 180, e.g., a software defined network (SDN) controller, that has knowledge of, or can learn about, the several routers in network 100 and the links connecting those routers. That is, each link shown connecting pairs of routers in FIG. 1 has two values associated therewith. A first value, on the left of the paired numbers, is an Internal Gateway Protocol (IGP) metric indicative of, in this example embodiment, "attractiveness" in regard to bandwidth capability. That is, a link with a relatively lower IGP metric means that that link has greater bandwidth and is therefore a more preferable link over which to route traffic. Indeed, in an IGP-operable network optimized for bandwidth, a packet having a source at Router A and a destination at Router Z will automatically travel the indicated IGP shortest path (solid arrows in FIG. 1), by following the paths whose sum of link metrics is lowest (again, in this case, indicative of highest bandwidth).

A second value, on the right of the paired numbers in FIG. 1, is a value of latency, in milliseconds, for that link. Taking segment 114 as an example, that segment has an IGP metric of 1 (making that segment much more attractive, from the perspective of bandwidth) and a latency of 50 ms. Segment 112 also has an IGP metric of 1, but a latency of 51 ms.

As can be appreciated by inspecting the several segments, a given packet, in accordance with IGP, will travel between Router A and Router Z via the tunnel comprising routers A-E-B-C-D-Z, i.e., the path that follows the solid arrows. That tunnel, while optimized for bandwidth, is not optimized for latency. An optimized latency path or tunnel would be via routers A-E-F-D-Z, as indicated by the broken arrow in FIG. 1. That is, the shortest path from the perspective of latency is that tunnel that has the lowest overall latency (by adding together the latency metric for each segment between endpoints).

In accordance with an embodiment, Segment Routing Tunnel Engineering (SR-TE) metric optimization is a technique relying on Segment Routing to provide alternative paths minimizing an additive TE metric (e.g., latency), which is different from the IGP metric used in the network (e.g., bandwidth). As explained above, this technique can be used to create minimum latency paths in an IGP network that is optimized for bandwidth. Hence, latency-driven service demands such as voice of Internet Protocol (VoIP) traffic could be placed over the shortest latency paths, while bandwidth-driven service demands can be made to follow the normal IGP. In the following discussion, the metric being optimized is latency. However, those skilled in the art will appreciate that the methodology described herein is also applicable to other additive metrics. The initial configuration of the link metrics in the network may also have been driven by an objective other than bandwidth optimization.

An objective of the methodology described herein is to compute, for each pair of endpoints, an SR tunnel enforcing one of the strictly shortest TE paths (minimizing the sum of the link latency along the path), with the minimum number of segments, identified by segment IDs (SIDs).

In some cases, the number of SIDs required to enforce such a path could be considered prohibitive for the operator, or impossible to push by the routing platform. In such a case, a methodology is implemented to provide the shortest possible TE path, constrained by an upper bound on the number of SIDs used to encode the path.

Operators do not necessarily need to use a strict shortest path, but can instead settle for a reasonably close optimal path and still provide sufficient quality of service to end users, e.g., VoIP callers. Thus, the methodology described herein provides a path offering latency within an absolute or relative margin compared to the optimum. The optimization objective of this embodiment thus becomes a minimization of the number of SIDs needed to encode a tunnel respecting this constraint.

A last variant of the methodology is to provide a tunnel whose latency is constrained to be within a margin of the optimum, while a SID stack size does not exceed a strict or predetermined constraint.

The methodology enables, e.g., a controller to efficiently compute SR tunnels among some pairs of nodes in an IGP network.

In one embodiment, the methodology computes TE optimized tunnels for every pair of nodes in the network. The methodology is based on an iterative approach that progressively allows more SIDs to be used. Hence, at a first iteration, the methodology computes SR tunnels enforcing the best possible TE path with at most one segment. At a second iteration, one more segment is allowed and every tunnel that could not enforce a shortest TE path with 0 or 1 segment is further optimized. This iterative process continues until an SR tunnel enforcing an optimal TE path has been found for every pair of nodes, or the maximum number of SIDs is reached.

The methodology relies on several matrices to store the relevant data, and from which values for calculations can be retrieved. These matrices are depicted in FIGS. 2-7 and are described in detail below. Rows and Columns of these matrices identify the nodes of the IGP network depicted in FIG. 1.

Figure 2:
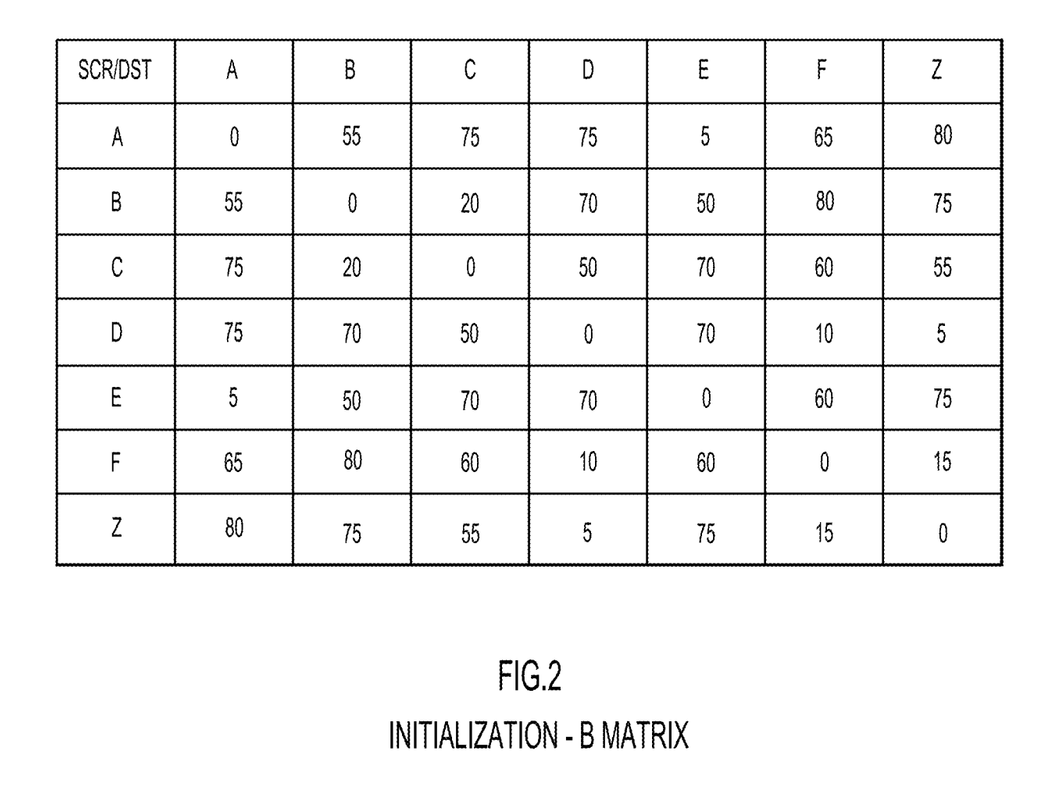
FIG. 2 depicts a matrix that shows best possible latencies between predetermined nodes in the network according to an example embodiment.

B(A,B): Best latency matrix provides the lowest possible latency from A to B (FIG. 2).

Figure 3:
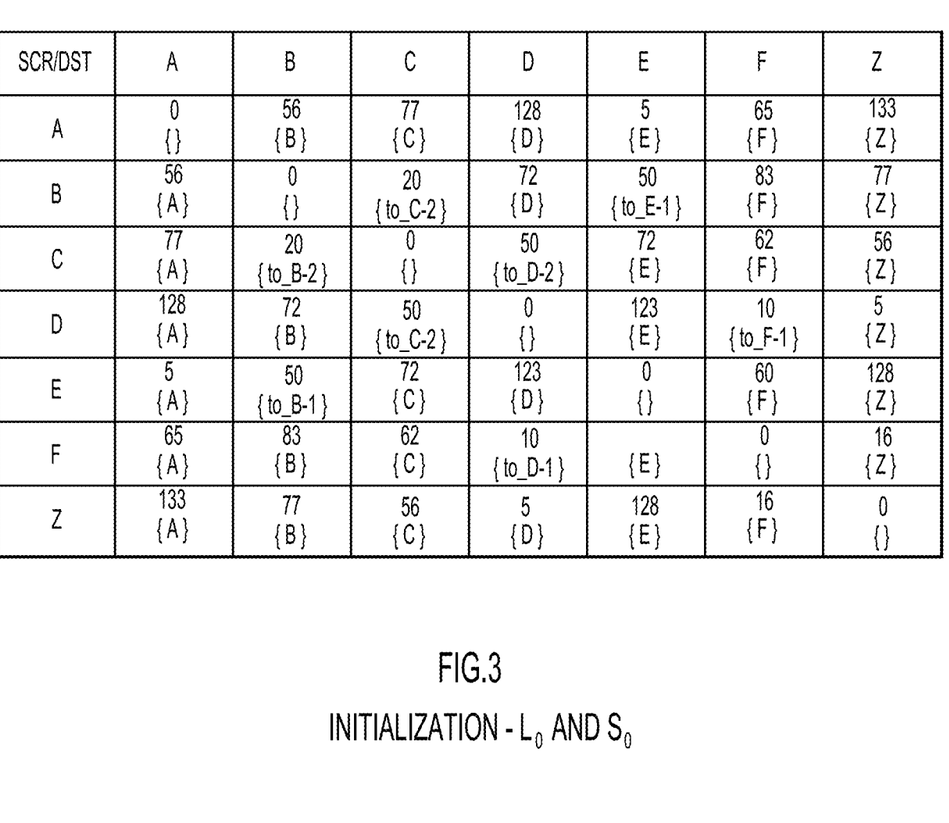
FIG. 3 depicts a combined segment list and latency matrix that shows initialized values according to an example embodiment.
Figure 4:
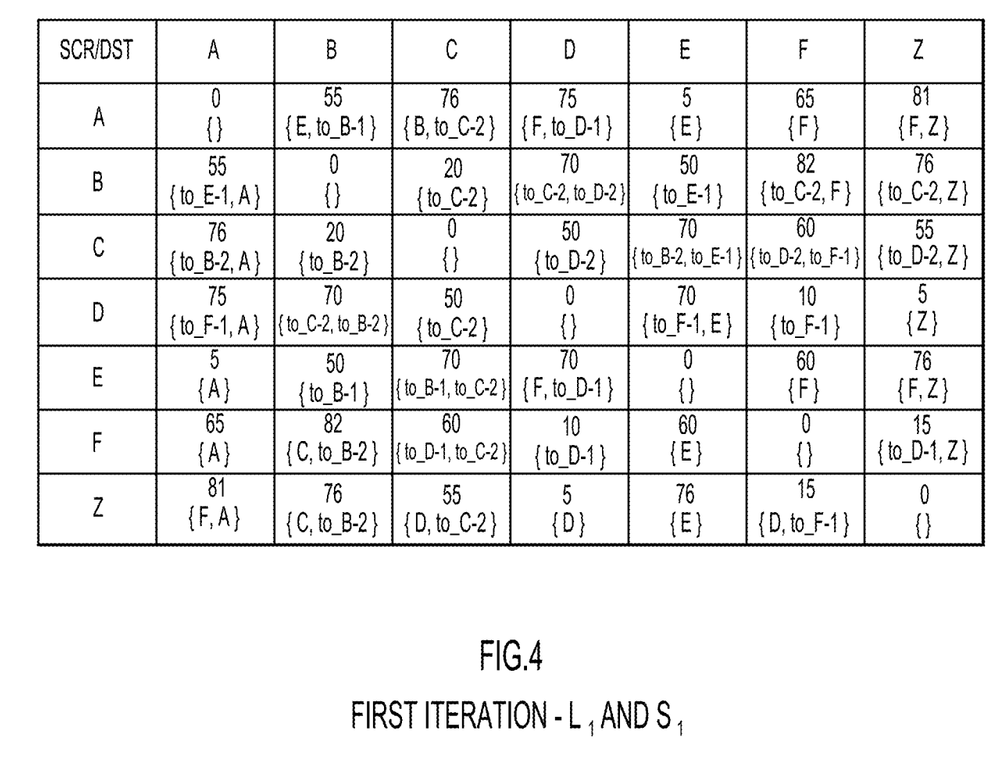
FIG. 4 depicts the combined segment list and latency matrix that shows values after one iteration of a latency optimization operation according to an example embodiment.
Figure 5:
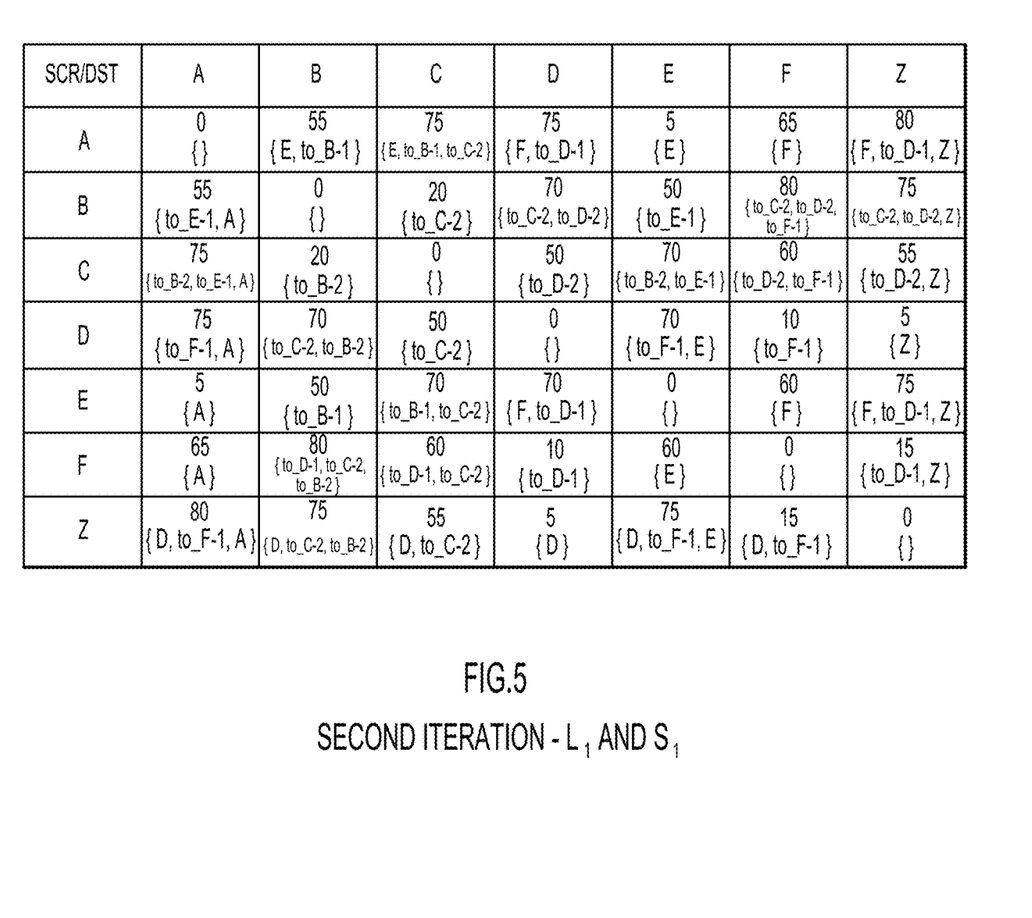
FIG. 5. depicts the combined segment list and latency matrix that shows values after a second iteration of a latency optimization operation according to an example embodiment.

$S_k(A,B)$: Segment list matrix is a list of SIDs encoding a lowest latency path from A to B with at most k intermediate segments (FIGS. 3-5).

$L_k(A,B)$: Latency matrix provides the latency corresponding to the path encoded by $S_k(A,B)$ (FIGS. 3-5).

Figure 6:
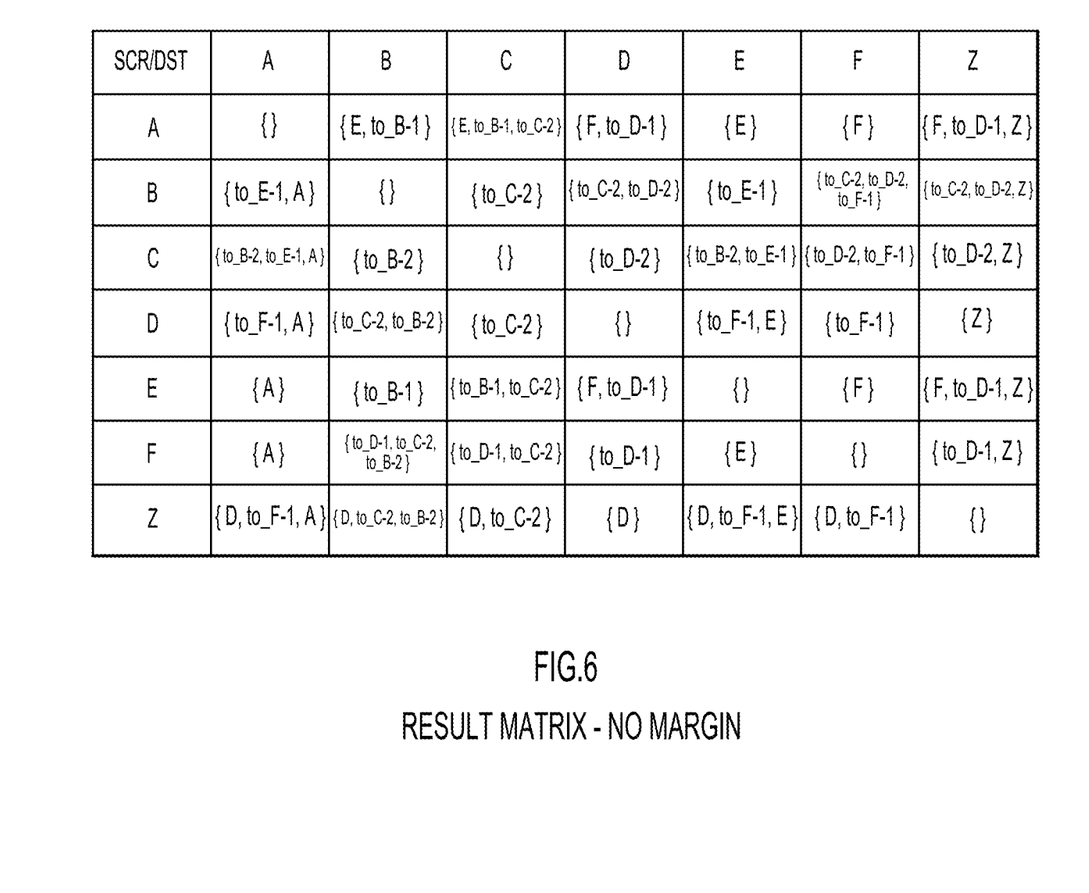
FIG. 6 depicts a results matrix without taking into account any margin according to an example embodiment.
Figure 7:
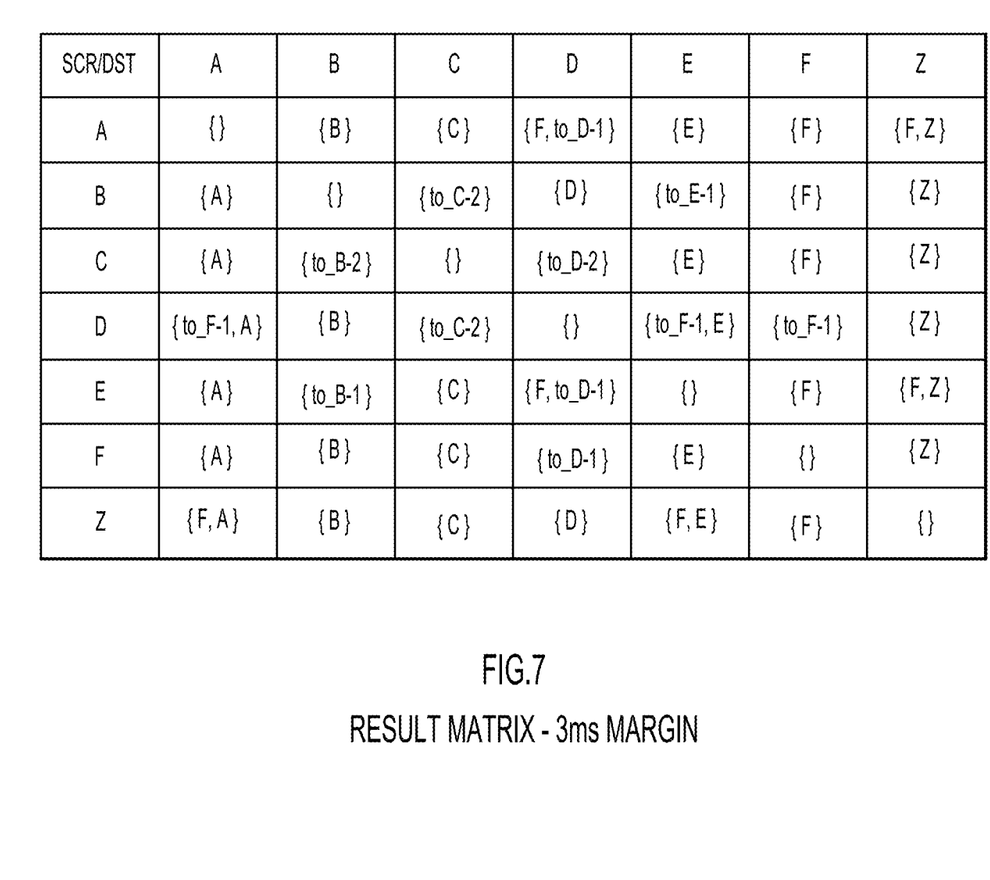
FIG. 7 depicts a results matrix that results from considering a 3 ms margin according to an example embodiment.

R(A,B): Result matrix is a list of SIDs corresponding to the result of the methodology algorithm for (A,B), i.e., entries of S at different iterations (FIGS. 6 and 7).

As will be appreciated by those skilled in the art, the overall approach is to obtain a latency metric for each segment, determine a tunnel through the network between a first endpoint and a second endpoint that is optimized for latency, and, once such a tunnel is determined, cause a packet to travel along the tunnel that is optimized for latency by encoding the packet with segment routing instructions that are optimized for a metric other than latency. Thus, at a high level, FIG. 2 shows the shortest latency between nodes or Routers in FIG. 1. FIG. 3 shows the initialization. Each cell of the matrix contains two values. The first value is the latency achieved with the currently found best solution (with a maximum of segments corresponding to the iteration step). The second value is the sequence of segments used to obtain the obtained latency. "X" represents a prefix segment to node X, "to_X-Y" represents the Adjacency Segment corresponding to the link ID Y connecting the current node to its neighbor X. The initial state of the matrix depicts the latency obtained when either no segment is pushed onto the packet, i.e., when using the IGP shortest paths through the network, or only by selecting an explicit directly connected link to send the packet, leaving the packet to follow the shortest path from that neighbor onwards. For example, the shortest paths from A to B at that iteration show a latency of 56. Indeed, A has no other choice than sending the packet to its neighbor E and let the packet follow the shortest path to destination B. This gives two such shortest paths, the first one follows the link sequence A-110-E-114-B, and the second one follows the link sequence A-110-E-112-B. 110 has a latency of 5 ms, 112 has a latency of 51 ms, and 114 has a latency of 50 ms. As a result, the first possible shortest path followed by a flow from A to B undergoes a total latency of 56 ms, and the second path undergoes a total latency of 55 ms. As there is no control on which of these two paths will be followed (a traditional IGP will simply load balance flows over these two), the potential worst-case latency for a non-steered flow from A to B is 56 ms. At iteration 1 of the methodology, the methodology has produced the sequence of SR segments whose maximum size is 1, providing the shortest possible latency by adding another segment. In this case, the matrix cell A→B after iteration contains {55 ms, E, to_B–1}. Indeed, by introducing the Adjacency Segment enforcing the selection of link 114, only the paths with a total latency of 55 ms will be followed by the flow.

Once an optimized tunnel is determined, a given packet can be caused to follow that tunnel by encoding the packet (i.e., a header thereof in accordance with the relevant protocol, e.g., MPLS) with appropriate next hop information, e.g., "go to C" using IGP optimized for bandwidth, but also include explicit instructions to select a given next hop node in order to exploit a lower latency path that would not have otherwise been selected.

More detail regarding methodology initialization and iterations is provided below.

Initialization $B(A,B)$ is initialized by running an all-pair shortest path algorithm based on the link latencies instead of the configured IGP metric. Thus, between Routers A and B in FIG. 1, the shortest latency path is 5+50, or 55, which is indicated in $B(A,B)$ in FIG. 2.

$S_0(A,B)$ is a segment list containing NodeSID(B), unless there exists a direct link L between A and B that has a lower latency than the shortest IGP path (and any other direct link) from A to B. In this case, $S_0(A,B)$=AdjSID(A, L).

$L_0(A,B)$ is the latency corresponding to the path encoded by $S_0(A,B)$.

$L_0(A,B)$ is the latency of the IGP shortest path from A to B when $S_0(A,B)$=NodeSID(B).

$L_0(A,B)$ is the delay on link L when $S_0(A,B)$=AdjSID(A, L).

$R(A,B)$ is an empty segment list.

Iteration

Each iteration of the methodology comprises computing a best possible tunnel using at most k segments, based on what was computed in the previous step (using at most k−1 segments). The goal is to compute $L/S_k(A,B)$ from $L/S_{k-1}$ and $L/S_{SID}$.

Iterate (A,B):
$S_k(A,B)=S_{k-1}(A,B)$
$L_k(A,B)=L_{k-1}(A,B)$
For each node n in N (n A):
If $L_k(A,B)>L_0(A,n)+L_{k-1}(n,B)$:
$S_k(A,B)=S_0(A,n)+S_{k-1}(n,B)$
$L_k(A,B)=L_0(A,n)+L_{k-1}(n,B)$ Complete Loop and Termination
k=0, stop=false
While k<max_segments and stop is false:
k=k+1, stop=true
For each pair (A,B) of nodes, such that A≠B:
Iterate (A,B)
If $R(A,B)=\emptyset$ and $L_k(A,B)<=B(A,B)+\text{MIN}(\text{margin\_abs}, B(A,B)\times\text{margin\_rel})$:
$R(A,B)=S_k(A,B)$
Else:
stop=false
For each pair (A,B) of nodes, such that A # B and $R(A,B)=\emptyset$:
$R(A,B)=S_k(A,B)$
Where there is no adjacent SID, the methodology is as above.

Reach Function
$R^0: N \times N \rightarrow T$
$R^0(A,B)$ is the maximum delay among the shortest paths from A to B, as defined by the IGP. That is, if a packet is sent to NodeSID B from A, the packet may follow a path with maximum delay $R^0(A,B)$ Computing $R^0(.,.)$ is equivalent to computing APSP (all-pair shortest path).

$O(N(N \log(N)+E))$ if based on N*Dijkstra.

Compute dijkstra, accumulate largest possible delay over the obtained paths.

Properties of paths made of one SID is a key input to all SR problems

Computation of $R^0$

This computation provides the delay from A to B without encapsulation and can be computed at the same time, and with the same complexity, as APSP.

Computation of $R^1$

---

$R^1 : N \times N \rightarrow T$
$R^1(A,B)$ provides the minimum delay from A to B, using at most one intermediate SID
$R^1(A,B) = \min(\ R^0(A,B),\ \min\ (R^0(A,n) + R^0(n,B)))$  go to N, go to B
         n in N                   Node(N), Node(B)
Complexity of $R^1 = O(R^0) + O(N^3) = O(N\ (N \log(N) + E) + O(N^3)) = O(N^3)$

---

Computation of $R^2$

---

$R^2 : N \times N \rightarrow T$
$R^2(A,B)$ provides the minimum delay from A to B, using at most two intermediate
$R^2(A,B) = \min(\ R^1(A,B),\ \min\ (R^1(A,n) + R^0(n,B)))$  go to N via another node N',
         n in N,                  go to B
                                  Node(N'), Node(N), Node(B)
Complexity of $R^2$
$= O(R^1) + O(N^3)$
$= O(N^3) + O(N^3) = O(2\ N^3)$

---

Computation of $R^3$

---

$R^3 : N \times N \rightarrow T$
$R^3(A,B)$ provides the minimum delay from A to B, using at most three intermediate
$R^3(A,B) = \min(\ R^2(A,B),\ \min\ (R^2(A,n) + R^0(n,B)))$  go to N via 2 other nodes N', N"
         n in N,                  go to B
                                  Node(N'), Node(N"),
                                  Node(N), Node(B)
Complexity of $R^3$
$= O(R^2) + O(N^3)$
$= O(N^3) + O(N^3) = O(3\ N^3)$ Computation of $R^k$

---

$R^k : N \times N \rightarrow T$
$R^k(A,B)$ provides the minimum delay from A to B, using at most k intermediate SIDs
$R^k(A,B) = \min( R^{k-1}(A,B), \min_{n \text{ in } N} (R^{k-1}(A,n) + R^0(n,B)))$ go to N via k-1 other nodes N1, N2, Nk-1, go to B Node(NK-1,), Node(N), Node(B)

Complexity of $R^k$
$= O(R^{k-1}) + O(N^3)$
$= O((k-1) N^3) + O(N^3) = O(k N^3)$

---

A solution meeting the optimization objective is typically found before reaching the termination for most pair of nodes (A,B). This happens in cases where the optimal solution requires fewer segments than the maximum allowed. As a result, a flag may be used to avoid iterating on the already optimized pairs. Note that this only applies to the strictly optimized pairs, and not the ones that respect a potentially specified margin. Further, these flags, encoded as N bit-strings capturing a row of L/S_{k-1}, can be used to skip the outer loop of the iteration, sparing entire parts of the $O(N^2)$ component of the complexity.

Each entry L/S_k(A,B) can be computed independently of the other, as its computation does not rely on any other cell of L/S_k, and no other state data structure is modified during an iteration of the methodology. As a result, it is straightforward to distribute this computation across multiple threads, roughly dividing the $O(N^2)$ by the number of threads used by the methodology.

Finally, in many cases, a service provider or operator does not wish to use an edge device as a transit point for flows not destined to the edge device itself. In a context where controller 180 is aware of the distinction between edge and core devices, the O(N) component of the complexity can be reduced to the set of core nodes. As the number of edge devices is typically much larger than the number of core ones, this optimization can bring relevant benefits, even if it affects the linear part of the iteration.

FIGS. 6 and 7 depict, respectively, results matrices without taking into account any margin and taking into account a 3 ms margin according to an example embodiment. Adhering to a strict shortest latency might result in using additional segments. In the event a given service, e.g., VoIP, can be supported with an additional amount of latency, it is possible to eliminate segments and simplify the routing of VoIP packets using Segment Routing, yet still optimize, albeit not to an absolute optimum level, for latency in a bandwidth optimized IGP network. Computational complexity can also be reduced by eliminating links that would otherwise be considered if the optimization were without any allowable margin.

Figure 8:
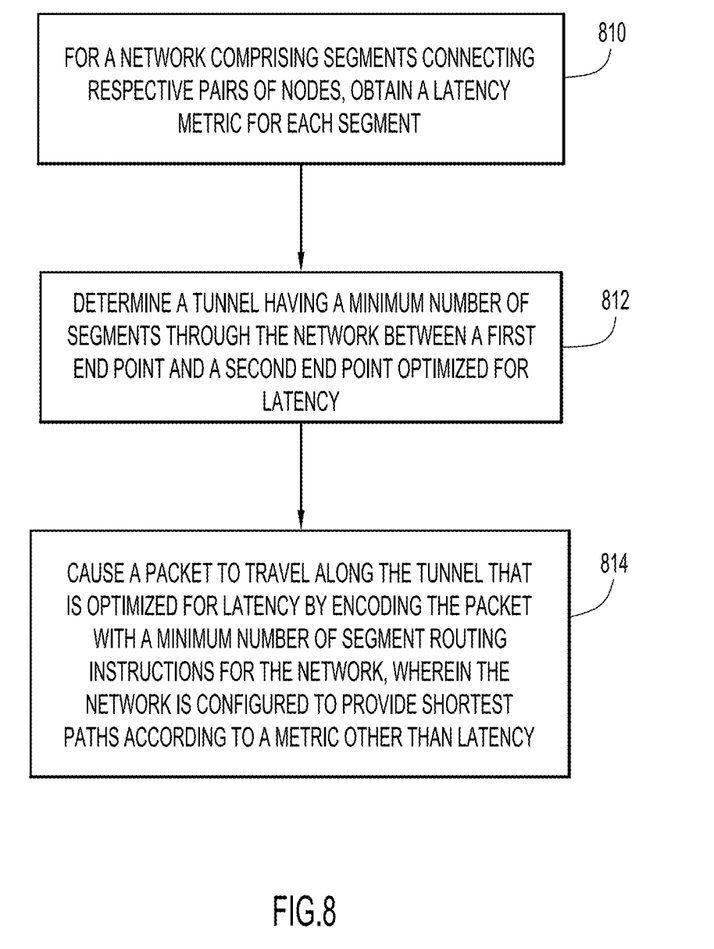
FIG. 8 is an example flow chart depicting several operations for performing latency optimization according to an example embodiment.

FIG. 8 is an example flow chart depicting several operations for performing latency optimization according to an example embodiment. At 810 the methodology provides for obtaining a latency metric for each segment that connects respective pairs of nodes in a network. At 812, a tunnel composed of the least number of segments is determined through the network between a first end point and a second endpoint, optimized for latency. At 814, a packet is caused to travel along the tunnel that is optimized for latency by encoding the packet with segment routing instructions that are optimized for a metric other than latency.

Figure 9:
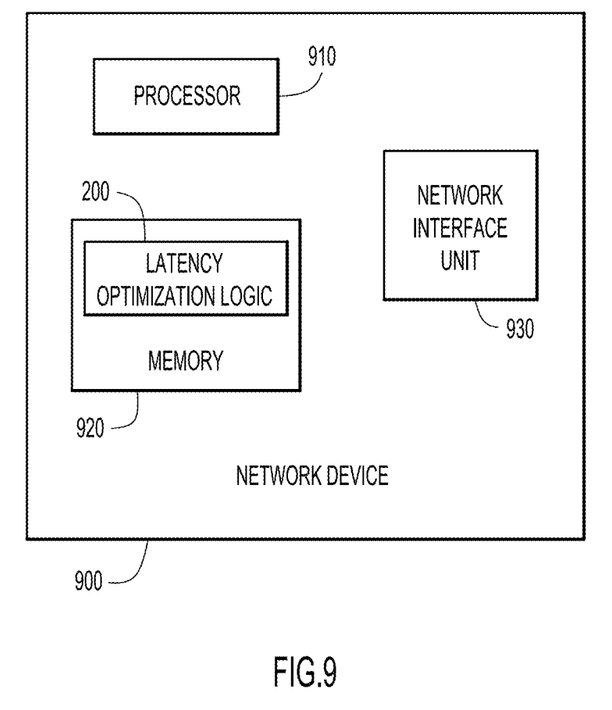
FIG. 9 depicts a block diagram of a network device, such as a controller, on which latency optimization logic may be hosted according to an example embodiment.

FIG. 9 depicts a block diagram of a network device 900 on which latency optimization logic 200 may be hosted according to an example embodiment.

Such a network device includes a processor 910, memory 920 and a network interface unit 930. Processor 910 may be configured to perform the functions of latency optimization logic 200 (e.g., the operations depicted in FIG. 8), among other functions. Memory 920 is configured to store a variety of data and software instructions including latency optimization logic 200 and the matrices depicted in FIGS. 2-7. Network interface unit 930 may include one or more ports or network interface cards via which the network device 900 can communicate with network components such routers A, B, C, D, E, F and Z, among other components.

Processor 910 may be, for example, a microprocessor or microcontroller that executes instructions for implementing the processes described herein. Memory 920 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 920 may comprise one or more tangible (non-transitory) computer readable storage media (e.g., a memory device) encoded with software comprising computer executable instructions and when the software is executed (by processor 910) is operable to perform the operations described herein.

In sum, there is provided an efficient methodology to compute latency optimized SR tunnels that can benefit from ECMP applied to the nodeSID's of the tunnel. The methodology provides the shortest possible latency path (optionally relaxed to be within a margin of the optimum), using the minimum number of SIDs (possibly constrained by an upper bound).

A particular benefit of this approach resides in its low computational complexity, further reduced by practical optimizations bringing drastic gains when applied to real ISP networks.

Explicitly leveraging SR for the computation of such tunnels allows adding the benefit of ECMP to the delay-engineered paths, which is not provided by RSVP-based solutions.

Further, the embodiments described herein are configured to provide a latency (or other additive metric) optimized tunnel through a network that has been optimized for, e.g., bandwidth and routes traffic using Segment Routing over an IGP.

In one form, a method is provided comprising: for a network comprising segments connecting respective pairs of nodes, obtaining a latency metric for each segment; determining a tunnel through the network between a first end point and a second endpoint that is optimized for latency; and causing a packet to travel along the tunnel that is optimized for latency by encoding the packet with a minimum number of segment routing instructions for the network, wherein the network is configured to provide shortest paths according to a metric other than latency.

In another form, an apparatus is provided comprising: a network interface unit configured to enable communications via an electronic communications network; a memory configured to store logic instructions; and at least one processor, when executing the logic instructions, is configured to: obtain a latency metric for each segment connecting respective pairs of nodes in the network; determine a tunnel through the network between a first endpoint and a second endpoint that is optimized for latency; and cause a packet to travel along the tunnel that is optimized for latency by encoding the packet with segment routing instructions for the network, wherein the network is configured to provide shortest paths according to a metric other than latency.

In still another form, a non-transitory tangible computer readable storage media encoded with instructions that, when executed by at least one processor, is configured to cause the processor to: obtain a latency metric for each segment connecting respective pairs of nodes in the network; determine a tunnel through the network between a first endpoint and a second endpoint that is optimized for latency; and cause a packet to travel along the tunnel that is optimized for latency by encoding the packet with a minimum number of segment routing instructions for the network, wherein the network is configured to provide shortest paths according to a metric other than latency.

The above description is intended by way of example only. Various modifications and structural changes may be made therein without departing from the scope of the concepts described herein and within the scope and range of equivalents of the claims.

What is claimed is:

1. A method comprising:
   for a network comprising segments connecting respective pairs of nodes, obtaining a latency metric for each segment;
   determining a tunnel through the network between a first end point and a second endpoint that is optimized for latency; and
   causing a packet to travel along the tunnel that is optimized for latency within a predetermined margin by encoding the packet with a minimum number of segment routing instructions for the network, wherein the network is configured to provide shortest paths according to a metric other than latency,
   wherein determining the tunnel comprises placing an upper bound on a number of segments that can be employed for the tunnel, and further comprises disregarding segments that include edge nodes, and
   wherein causing a packet to travel along the tunnel comprises causing the packet to traverse a selected segment in the network, different from a segment that would be traversed as a result of the network being optimized for the metric other than latency.

2. The method of claim 1, wherein determining a tunnel comprises optimizing the tunnel based on a minimum number of segments.

3. The method of claim 1, wherein determining a tunnel comprises allowing for a predetermined amount of latency margin.

4. The method of claim 1, wherein the metric other than latency is bandwidth.

5. The method of claim 1, wherein the method is performed in a software defined network (SDN) controller.

6. The method of claim 1, wherein at least one of the nodes is a router, and the method is performed in the router.

7. The method of claim 1, wherein packets are caused to travel along the tunnel using the Interior Gateway Protocol (IGP).

8. The method of claim 1, further comprising storing, in respective matrices, values of best latency between respective pairs of nodes, a list of segment IDs encoding a lowest latency path between respective pairs of nodes with at most k intermediate segments, and values of latency corresponding to a path between the respective pairs nodes of nodes.

9. An apparatus comprising:
   a network interface unit configured to enable communications via an electronic communications network;
   a memory configured to store logic instructions; and
   at least one processor, when executing the logic instructions, is configured to:
     obtain a latency metric for each segment connecting respective pairs of nodes in the network;
     determine a tunnel through the network between a first endpoint and a second endpoint that is optimized for latency; and
     cause a packet to travel along the tunnel that is optimized for latency within a predetermined margin by encoding the packet with segment routing instructions for the network, wherein the network is configured to provide shortest paths according to a metric other than latency, and
   wherein the at least one processor, when executing the logic instructions, is configured to determine the tunnel by placing an upper bound on a number of segments that can be employed for the tunnel and by disregarding segments that include edge nodes, and further configured to cause a packet to travel along the tunnel by causing the packet to traverse a selected segment in the network, different from a segment that would be traversed as a result of the network being optimized for the metric other than latency.

10. The apparatus of claim 9, wherein the processor, when executing the logic instructions, is further configured to determine the tunnel for latency based on a minimum number of segments.

11. The apparatus of claim 9, wherein the processor, when executing the logic instructions, is further configured to determine the tunnel by allowing for a predetermined amount of latency margin.

12. The apparatus of claim 9, wherein the metric other than latency is bandwidth.

13. The apparatus of claim 9, wherein apparatus is part of a software defined network (SDN) controller.

14. The apparatus of claim 9, wherein the apparatus is part of a router.

15. The apparatus of claim 9, wherein packets are caused to travel along the tunnel through the network using the Interior Gateway Protocol (IGP).

16. A non-transitory tangible computer readable storage media encoded with instructions that, when executed by at least one processor, is configured to cause the processor to:
   obtain a latency metric for each segment connecting respective pairs of nodes in the network;
   determine a tunnel through the network between a first endpoint and a second endpoint that is optimized for latency; and
   cause a packet to travel along the tunnel that is optimized for latency within a predetermined margin by encoding the packet with a minimum number of segment routing instructions for the network, wherein the network is configured to provide shortest paths according to a metric other than latency, wherein, when the instructions are executed, the at least one processor is configured to determine the tunnel by placing an upper bound on a number of segments that can be employed for the tunnel and by disregarding segments that include edge nodes, and wherein, when the instructions are executed, the at least one processor is further configured to cause a packet to travel along the tunnel by causing the packet to traverse a selected segment in the network, different from a segment that would be traversed as a result of the network being optimized for the metric other than latency.

17. The non-transitory tangible computer readable storage media of claim 16, wherein, when the instructions are executed, the at least one processor is configured to determine the tunnel for latency based on a minimum number of segments.

18. The non-transitory tangible computer readable storage media of claim 16, wherein, when the instructions are executed, the at least one processor is configured to determine the tunnel by allowing for a predetermined amount of latency margin.

* * * * *